United States Patent [19]

Weinert et al.

[11] Patent Number: 4,741,185
[45] Date of Patent: May 3, 1988

[54] VEHICULAR TAPE DECK LOCKING AND LOCK-STATE INDICATING ARRANGEMENT

[75] Inventors: Alfons Weinert, Hildesheim; Klaus Gröger, Diekholzen, both of Fed. Rep. of Germany

[73] Assignee: Blaupunkt Werke GmbH, Hildesheim, Fed. Rep. of Germany

[21] Appl. No.: 851,771

[22] Filed: Apr. 14, 1986

Related U.S. Application Data

[63] Continuation-in-part of Ser. No. 799,030, Nov. 18, 1985, abandoned.

[30] Foreign Application Priority Data

Nov. 30, 1984 [DE] Fed. Rep. of Germany ....... 3443651
Jun. 8, 1985 [DE] Fed. Rep. of Germany ....... 3520604

[51] Int. Cl.$^4$ ............................................. E05B 65/00
[52] U.S. Cl. ............................................. 70/57; 70/63; 70/85; 70/432; 70/14; 248/27.1; 362/800
[58] Field of Search ............... 70/432, 434, 441, 1, 70/57, 58, 63, 70, 79, 80, 81, 14, 85–87, 167–169, 229; 360/137; 362/800; 248/27.1, 27.3

[56] References Cited

U.S. PATENT DOCUMENTS

| | | | |
|---|---|---|---|
| 2,257,741 | 10/1941 | Gray | 70/85 |
| 2,588,176 | 3/1952 | Strauch | 70/57 |
| 2,623,959 | 12/1952 | Jarrett | 70/441 |
| 2,938,373 | 5/1960 | Gray et al. | 70/86 |
| 3,370,446 | 2/1968 | Francis | 70/229 |
| 3,410,122 | 11/1968 | Moses | 70/232 |
| 3,427,835 | 2/1969 | Jeffee | 70/441 |
| 3,563,070 | 2/1971 | Earl | 70/232 |
| 3,934,105 | 1/1976 | Lockard | 362/800 |
| 4,010,989 | 3/1977 | Klug | 70/85 |
| 4,030,788 | 6/1977 | Bleeker | 70/85 |
| 4,066,307 | 1/1978 | Barding | 312/242 |
| 4,093,328 | 6/1978 | Libianchi | 312/333 |

(List continued on next page.)

FOREIGN PATENT DOCUMENTS 2042040 3/1972 Fed. Rep. of Germany ........ 70/434
2903176 12/1983 Fed. Rep. of Germany .
2401802 4/1979 France .................................. 70/441
8105741 7/1983 Netherlands ......................... 70/57
2131219 6/1984 United Kingdom ................ 70/57

OTHER PUBLICATIONS

Crutchfield Catalog, p. 19.

Primary Examiner—Gary L. Smith
Assistant Examiner—Suzanne L. Dino
Attorney, Agent, or Firm—Frishauf, Holtz, Goodman, & Woodward

[57] ABSTRACT

To retain an accessory apparatus including a tape unit, such as a tape deck forming part of an automobile radio, in a vehicle, such as a car or a boat, a dummy cassette (17) is provided, having an externally visible lock (18) which operates a locking bolt (23) which, upon lock operation, deflects from an aligned position with the dummy cassette through a window in the accessory or tape deck housing and through a holding frame (11) or holding strap (30) secured in the vehicle. The windows (27, 27', 27") in the dummy cassette, the accessory apparatus including the tape deck and the frame or strap in the vehicle are in alignment so that the bolt can be passed therethrough, thus preventing removal of the accessory apparatus from the vehicle. Preferably, the lock is so placed that it is visible, so that it will be immediately apparent that the accessory apparatus is locked against removal. An optical indicator, for example a light emitting diode (LED) (32) can also be provided in the dummy cassette, energized from a battery, which may be a rechargeable battery, floatingly connected to the vehicle battery, or the LED can be directly connected to the vehicle battery by suitable terminal contacts located on the dummy cassette, which is preferably of plastic, and engageable with energizing contacts located on the holding frame (11) thereof. The LED can be connected to a flasher to provide a flashing warning indication that a locking system is armed. The locking bolt (23) forms a switch terminal to close a circuit to the LED when the lock is locked, providing a warning that a security system is in use, and armed.

19 Claims, 3 Drawing Sheets

U.S. PATENT DOCUMENTS

| | | | |
|---|---|---|---|
| 4,131,001 | 12/1978 | Gotto | 70/432 |
| 4,235,492 | 11/1980 | Conger | 70/85 |
| 4,341,166 | 7/1982 | Cantley | 70/85 |
| 4,365,280 | 12/1982 | Crosetti et al. | 360/137 |
| 4,401,350 | 8/1983 | Fortune | 312/333 |
| 4,453,390 | 6/1984 | Moritz et al. | 70/434 |
| 4,527,405 | 7/1985 | Renick et al. | 70/58 |
| 4,550,944 | 11/1985 | Simon et al. | 312/242 |
| 4,553,414 | 11/1985 | Caputo et al. | 70/167 |
| 4,555,080 | 11/1985 | Nara | 248/27.1 |
| 4,556,932 | 12/1985 | Lehrer et al. | 362/800 |
| 4,557,445 | 12/1985 | Ohara | 248/27.1 |
| 4,577,818 | 3/1986 | Clarisse | 248/27.3 |
| 4,582,290 | 4/1986 | Baron | 248/27.1 X |
| 4,616,490 | 10/1986 | Robbins | 70/14 |

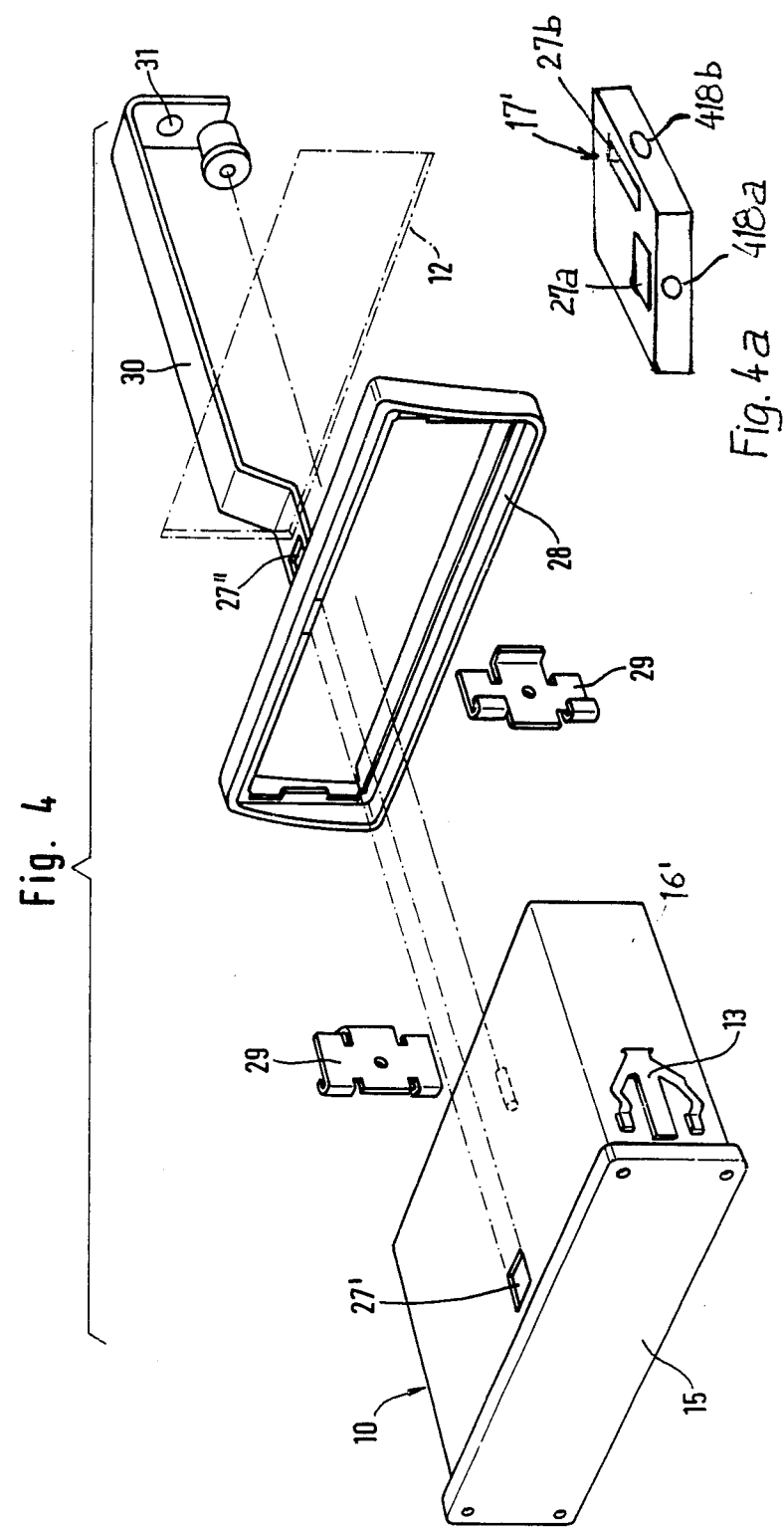

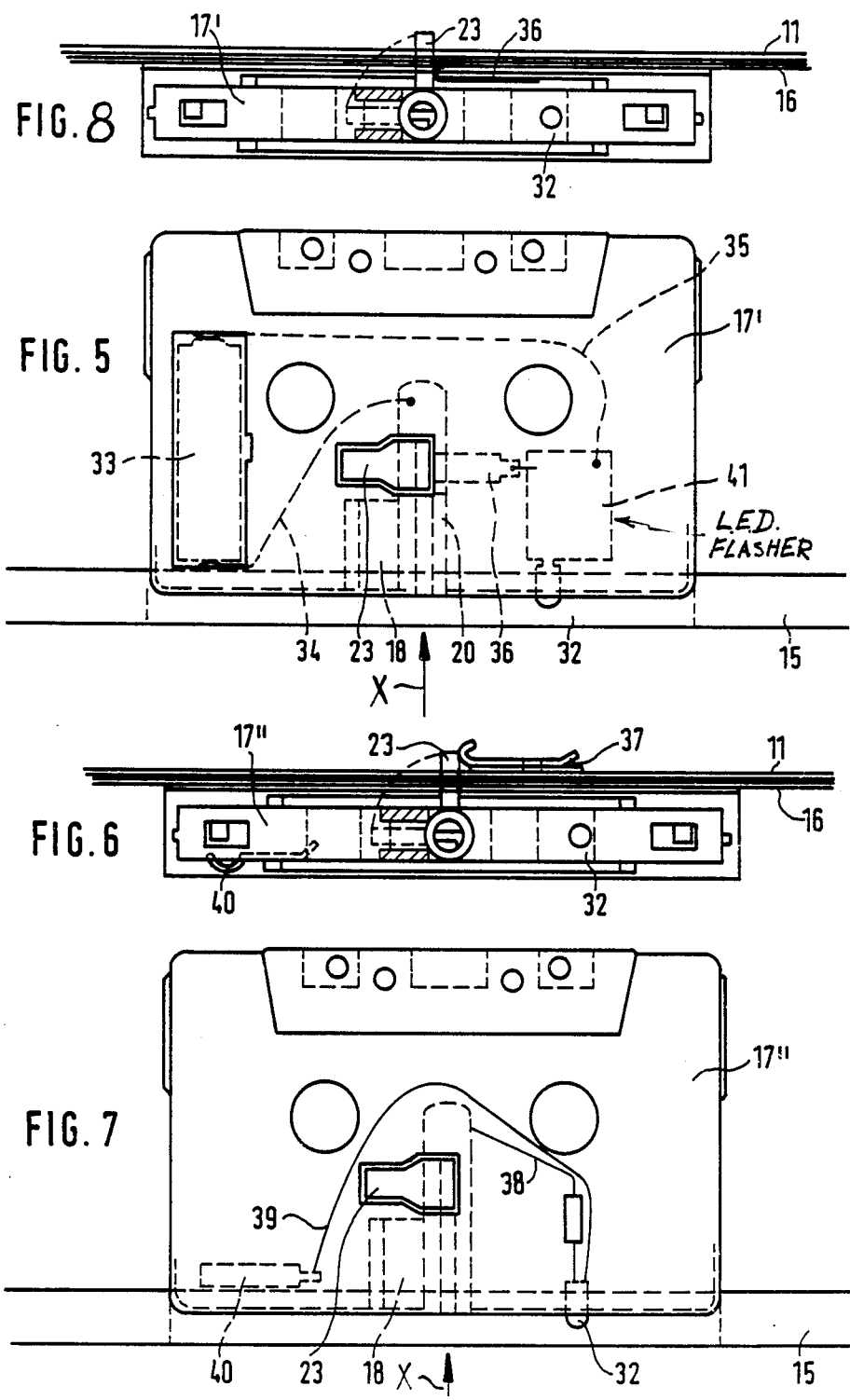

VEHICULAR TAPE DECK LOCKING AND LOCK-STATE INDICATING ARRANGEMENT

This is a continuation-in-part of our earlier filed and subsequently abandoned application: U.S. Ser. No. 799,030, filed Nov. 18, 1985.

The present invention relates to a locking system, or anti-theft system, for accessory apparatus for vehicles, particularly radio-cassette combinations for use in automobiles.

BACKGROUND

Automobile radio-cassette recorders and the like customarily have a radio portion and an insertion opening for recorded cassettes. The entire radio-cassette player unit is customarily introduced from the passenger compartment of the vehicle into an opening formed in the dashboard or front wall of the vehicle. The dashboard or front of the vehicle has a frame which, itself, may be separable therefrom, the frame and the housing of the radio-cassette player including interengaging snap-in connections to hold the radio or the frame portion of the vehicle.

"Vehicles", as referred to herein, does not only relate to automobiles, but to all kinds of vehicles capable of receiving persons, such as boats and the like.

Accessory radio-cassette players can be attached in the vehicle other than by interengaging snap-in connections, for example by screws or the like. The radio-cassette players, to which reference will be made hreinafter for simplicity, are preferably connected by such snap-in connections, however, since they premit ready removal for repair or exchange of different models upon insertion of appropriate tools available generally only to authorized installers or repair stations. Accessory apparatus as used herein refers to any electronic apparatus which includes a cassette tape player, that is, not only car radio-cassette players as such, but also video apparatus, computer apparatus, calling and telephone systems, automatic tape calling systems, citizen band (CB) radios, and the like.

Electronic theft locks or theft alarm systems often are so arranged that the accessory apparatus upon theft, that is, unauthorized removal, becomes useless. Yet, prior to breaking into a vehicle, a thief may not know this and the theft of the apparatus as such cannot, thereby, be prevented.

THE INVENTION

It is an object of the present invention to provide a mechanical lock which is simple, sturdy, and inexpensive, and can be applied, universally, to any type of electronic unit which includes a tape cassette, and which will require only minor modification of the electronic unit and/or the reception frame for the unit in the vehicle; and, further, which provides a visual indication to a potential thief that the unit is secured and that a planned theft, therefore, may cause problems and should not be undertaken in the first place.

Briefly, a dummy cassette is provided, shaped to fit into the cassette openings of the cassette recorder portion of the accessory apparatus. The dummy cassette has a lock, accessible—and preferably visible—from the front side of the cassette, the lock having a locking bail which is movable between an open, or unlocked and a closed, or locked position upon operation of an appropriate key. The dummy cassette, the accessory housing, and a reception frame or other element secured within the vehicle and forming a component or attachment element thereof, inaccessibly positioned, is shaped to receive the locking bail when the lock is moved to locked position, for example by being formed with aligned windows in which the locking bail can engage.

In accordance with a further feature of the invention, an electrically operated light source is provided on the dummy cassette, coupled to electrical switch terminals operable upon operation of the lock to connect the light source to either illuminate or blink when the lock is closed, thereby providing a visual signal that the accessory apparatus is locked. This visual signal can be observed from the outside of the vehicle and may give an indication to a thief that a theft alarm system is present, and armed. It may deter a thief from breaking into the vehicle.

The arrangement has the advantage that the dummy cassette will reliably interlock the accessory apparatus and a sturdy component of the vehicle which is inaccessible, being located behind the dashboard, and thus not subject to deformation or removal without time-consuming disassembly (or destruction). Thus, a potential their cannot remove the accessory apparatus, for example a valuable and expensive cassette car radio from the insertion opening within the vehicle wall or within the dashboard, even if it would be possible to override the snap-in or holding connection of the housing of the radio-cassette unit in its frame by use of a home-made or otherwise obtained removal tool. The locked bail of the dummy cassette—all of which can be made of sturdy, not readily broken material, will prevent removal of the entire unit from the vehicle.

The arrangement has the additional advantage of locking the radio-cassette unit and the vehicle or reception frame, respectively, and thus can be applied to many types of radios without requiring any modification of the electrical circuitry thereof. Retrofitting an existing car radio-cassette unit, and the respective reception frame, likewise is simple and inexpensive. The lock can be used with types of radios which are either screw-connected in the dashboard wall of the vehicle, or units which are secured by snap-in connections. The location of the tape-reception radio with respect to the radio, likewise, is irrelevant; most radios have the tape reception opening either beneath the radio apparatus or thereabove—hardly ever in the middle. The cassette can be inserted, thus, either on the top, with the bail extending through a window formed in the top of the reception frame, or at the bottom, with a suitable opening formed in the bottom of the frame. The dummy locking cassette can be used with any type of tape transport system, including automatic tape guidance and pull-in about a tape recording path, and regardless of whether the respective transducer heads are located at the left, at the right, or at an intermediate position of the cassette. The arrangement is equally suitable for cassettes inserted longitudinally into a radio, transversely into a radio, or flat in a front reception slot; in the latter case, the locking bail from the lock, preferably, will extend laterally from both longitudinal or horizontal sides, as the structure may be, of the cassette.

Any modification of the accessory apparatus, the reception frame, or a holding strap for the radio already present within the vehicle requires merely formation of an opening to receive the locking bail or locking bolts of the lock in the dummy cassette.

The invention is applicable to all cassette units in which the cassette is inserted from the front side of the unit. It has the additional advantage that a potential thief is warned before he may break into the car, since the lock on the dummy cassette can be easily seen already through a car window, thus warning a potential thief that theft of the entire unit may cause more problems than the procedure might be worth.

Upon opening of the lock, and removal of the dummy cassette from the accessory apparatus, by use of a suitable key in accordance with the lock being used, the unit is immediately operable, either as a radio, if so provided, or to receive a prerecorded cassette or to record thereon.

Some vehicles receiving accessory apparatus may not be formed with a reception frame for the accessory unit. In such a case, however, usually fixed straps or holding bars are provided to hold the weight of the unit so that it will not be supported entirely by the dashboard itself. It is a simple matter to form the window into which the bail can engage either in an already existing holding strap or bar, or to install, with the accessory unit removed, such a holding strap or bar and secure it reliably in the vehicle, considering that the holding strap or bar will be inaccessible after the unit, which has been locked by the dummy cassette, has been inserted within the opening.

DRAWINGS

FIG. 4 is an exploded perspective view of a locking arrangement of an accessory apparatus in a vehicle panel in which the vehicle does not have a reception frame;

FIG. 4a illustrates an arrangement in which two locks 418a and 418b are provided, and the locking axes of the locks extend transversely with respect to each other to permit selective insertion of the dummy cassette into cassette openings selectively receiving the cassette longitudinally or transversely;

FIG. 5 is a view similar to FIG. 2, and showing connection of a light indicator and flasher in the dummy cassette;

FIG. 6 is a view similar to FIG. 3, illustrating the dummy cassette inserted, and one form of an electric connection;

FIG. 7 is a view similar to FIG. 5, illustrating another embodiment; and

FIG. 8 is a front view of the dummy cassette, inserted, similar to FIG. 6, in which the dummy cassette includes a battery, as shown in the top view in FIG. 5.

DETAILED DESCRIPTION

Figure 1:
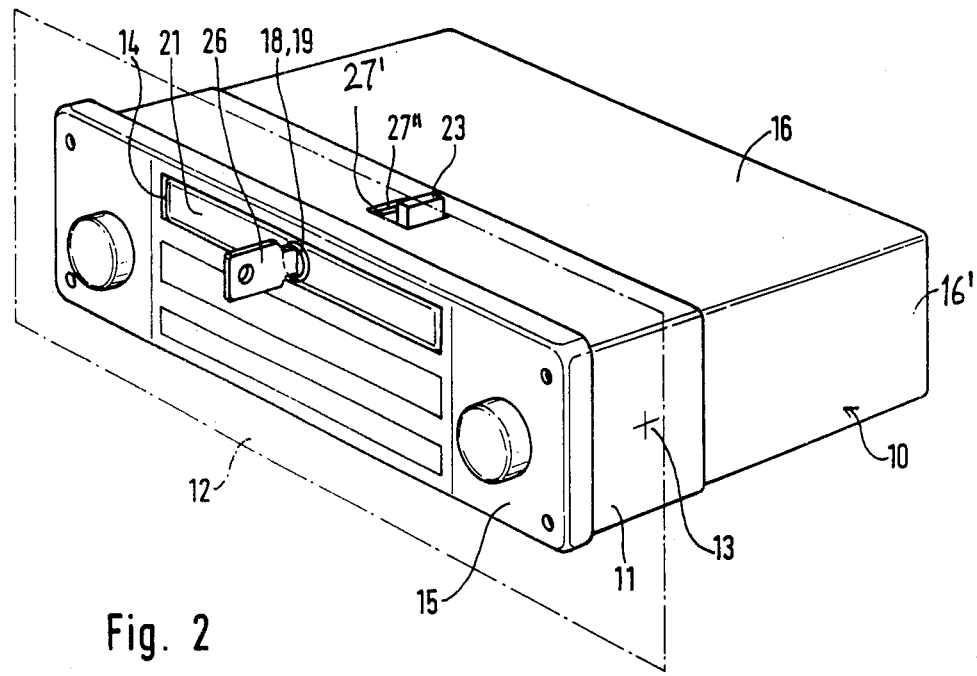
FIG. 1 is a perspective view of a radio-cassette recording unit installed through the dashboard of an automotive vehicle, in which the dashboard is shown in phantom representation, and illustrating insertion of a dummy cassette and locking of the unit in the vehicle.

An accessory apparatus 10, including a housing 16' and having a cassette spooling system in the housing, is received in a front panel, for example the dashboard 12 of a vehicle, and retained therein by a reception frame 11. Panel 12 is shown in phantom representation, partly outlined by a chain-dotted line. The reception frame 11 is securely connected in the vehicle, for example by being secured to the panel 12 in any suitable and well-known manner. The accessory apparatus 10 can be released from the frame 11 by releasing intergaging snap-in connections or projection-and-recess elements, shown only schematically at 13, for example by windows formed in the side walls of the frame 11 into which resilient outwardly pressed catch element can engage. Such interengaging connections are well known, see for example the referenced German Patent No. 29 03 176.

The accessory apparatus has a front plate 15 which carries the operating knobs or buttons for the radio-cassette units. It is formed with an insertion opening 14 for recorded or recording cassettes, for example audio cassettes. As illustrated, the arrangement is capable of receiving cassettes inserted—see arrow X—horizontally, with the tape traveling parallel to the rear wall of the cassette, upon transverse insertion of the cassette through the opening 15, and beyond the front edge of the frame 11. The tape transport apparatus and a tape transport control capstan—all well known and of standard construction—may be located for example close to the top wall 16 of the housing 16' of the accessory apparatus and at the rear portion thereof.

The accessory apparatus 10 can be removed, forwardly, from the front plate 15 by introducing suitable tools into openings formed in the front plate 15 which, then, release the locking catches of the interengaging projection-and-recess means 13. For example, pins can be introduced through suitable openings to press projecting abutments fitted into windows in the frame 11 inwardly, so that the accessory apparatus 10 can be removed from the frame 11, and, hence, removed from the vehicle. This arrangement is well known.

Figure 2:
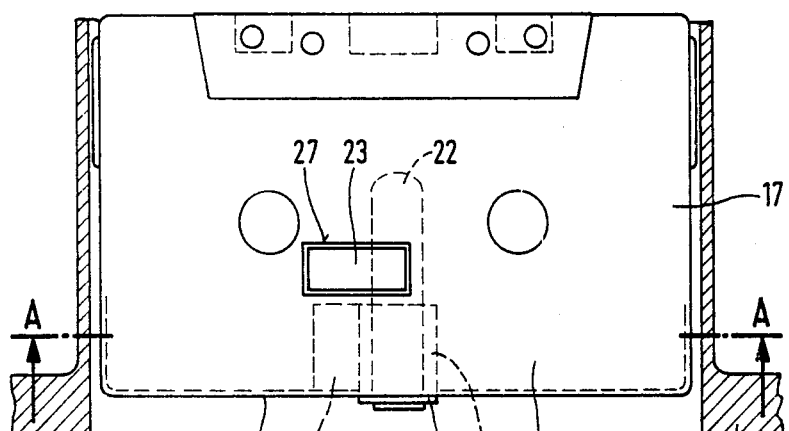
FIG. 2 is a fragmentary top sectional view of the arrangement.

In accordance with the present invention, a dummy cassette 17 is provided which will fit exactly into the cassette reception space provided in the accessory apparatus 10. The dummy cassette will have, usually, the same general outline as an operative cassette. Centrally within the dummy cassette, and parallel to the insertion direction, indicated by the arrow in FIG. 2, a commercial cylinder lock 18 is provided, and so integrated therein that the facing surface, carrying a key reception opening, or an escutcheon plate 19 of a locking cylinder 20 will be essentially flush with the front plate 15 of the accessory apparatus 10. The front wall 21 of the cassette and the front plate 15 of the accessory apparatus then will also be essentially flush. The lock 18, operable by a key 26, carries a locking pin 22 on which a locking bail or locking bolt extension 23 is secured.

OPERATION

Figure 3:
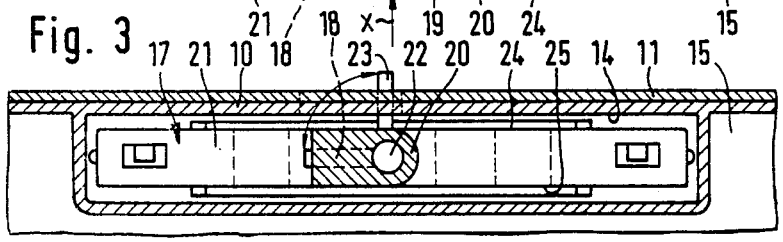
FIG. 3 is a fragmentary sectional view taken along line A—A of FIG. 2, and illustrating the movement of the locking bail.

When the lock is open, and to remove the dummy cassette, the key 26 is turned to a position in which the locking bolt 23 will be placed horizontally between the top 24 and the bottom 25 of the dummy cassette 17—see FIG. 3. Upon rotation of the cylinder lock 18, by moving the key 26 by 90° towards the right, the locking pin 22 will carry the bolt 23 from the horizontal position of FIG. 3 into the vertical position shown in FIGS. 1 and 3, in FIG. 3 in open lines.

In accordance with a feature of the invention, the top surface 24 of the dummy cassette 17 has a window 27 formed therein, so located that the locking bolt 23 can readily pass therethrough and, when in vertical position, engages one lateral side of the window. To permit simultaneous, common locking, the top wall 16 of the accessory apparatus 10 is formed with a window 27'. The top wall of the frame 11 is formed with a window 27". Windows 27, 27' and 27" are aligned. Thus, the locking bolt 23 will engage through all three window portions 27, 27', 27", thereby locking together the dummy cassette 17, the accessory apparatus 10 and the frame 11. Frame 11, as noted, is securely connected in the vehicle. Consequently, the accessory apparatus 10 is reliably and irremovably locking in the vehicle. A potential thief still could release the interengaging snap connections 13 between the accessory apparatus 10 and the frame 11; yet, the accessory apparatus cannot be removed since the bolt 23 will engage in the window 27" of the frame. Removal, without destruction, is possible only by opening the cylinder lock 18 with the appropriate key 26. The bolt 23 then will be rotated to the horizontal position (FIG. 3) out of the windows 27", 27' and through the windows 27 of the dummy cassette, into the horizontal quiescent position within the dummy cassette 17. In this position, the dummy cassette 17 together with the key 26 can be removed from the accessory apparatus and an audio cassette inserted; if desired, for example for repair or replacement, the accessory apparatus 10 can be released from the frame 11 in well known manner. The bolt 23, or course, is of sufficient length to engage in the frame 11 of the vehicle, that is, pass through and extend at least in and preferably beyond window 27" of the frame 11, as clearly seen in FIG. 1.

The arrangement is readily adaptable for accessory apparatus 10 in which the tape transport mechanism and the opening 14 for the cassette are located at the bottom of the unit, merely by reversing the dummy cassette 17 end-for-end with respect to the position shown, and forming the respective windows 27', 27" in the bottom of the frame 11. The cassette, itself, thus can be used for arrangement as shown, or for bottom-loading radio-cassette units.

In mass-production manufacture, frames 11 can be formed with suitably placed windows 27" both at the top and at the bottom for reception of various types of radios, as described.

FIG. 4 illustrates a modification in which the reception frame 28 is foreshortened and secured by brackets 29 in the vehicle wall 12. The snap-in connections 13, which have spring arms engaging behind holding surfaces of the brackets 29, retain the accessory apparatus 10 in position in the frame 28. The frame 28, however, is to short to permit formation of a window therein for reception of the locking bolt 23. A flat strap 30 is provided, engaging the frame 28, the flat strap 30 being formed with the window 27". Flat strap 30 is securely attached to the vehicle, for example by a screw or rivet connection 31.

Upon insertion of the frame 28 into a panel, for example the dashboard of a vehicle, and retention of frame 28 in the brackets 29 in the panel 12, accessory apparatus 10 can be inserted and the holding arrangement 13 will securely retain the accessory apparatus in the frame and also engage the brackets 29. In this position, the window 27' of the accessory apparatus 10 will align with the window 27" of the strap 29. Accessory apparatus and strap 29, and hence the vehicle, can be separated, upon insertion of a dummy cassette and rotation of the locking bolt 23 to the position shown in FIG. 1, only upon subsequent rotation of the key 26 to withdraw the bolt 23 from windows 27' and 27".

Various changes and modifications may be made; for example, dummy cassettes can be formed with two security locks, making the cassettes suitable for both longitudinal as well as transverse insertion. The locking bolts need not be rectangular in cross section; they may be round, and the windows 27', 27" preferably are so positioned that, with respect to longitudinal movement of the accessory apparatus 10, that is, along the arrow of FIG. 2, the bolt will engage the windows 27', 27" rather snugly.

In accordance with a further feature of the invention, and as illustrated in FIGS. 5 to 8, dummy cassettes 17', 17" are used which, respectively, include a light source, typically a light emitting diode (LED) 32. The LED 32 is so arranged that, when the dummy cassette is inserted into the apparatus, the light from the LED 32 is clearly visible.

Referring first to FIG. 5: A dummy cassette 17' has a battery 33 located therein, forming a current or energy source for the LED 32. The terminals of the battery are connected over lines 34, 35 with the cylinder 20 of the lock and with the input terminal of an LED flasher 41, serially connected with the LED 32. The other terminal of the flasher or pulse source 41 is electrically connected with a contact spring 36, secured to the dummy cassette 17'. The contact spring is so located that when the locking bail or bolt 23 is in locked condition, it forms an electrical contact with the contact spring 36. The LED 32 then will have a closed circuit through the flasher, and provide a continuous flashing output. The front of the cassette, installed, is shown in FIG. 8.

The dummy cassette, preferably, is made of plastic, and hence of non-conductive material. The circuit with the battery, thus, can readily be integrated on the cassette.

An optical indication can also be obtained, as shown in FIGS. 6 and 7, by using the battery of a vehicle in which the accessory equipment is installed as the current source. The cassette 17', 17", again, is of insulating material, for example plastic. Current supply is effected over a first contact spring 37, insulatingly connected to the frame 11 in the vehicle. The contact spring 37 is so positioned that the blocking bail or bolt 23 is contacted when the bolt or bail extends through the respective window 27. The spring 37, of course, is connected to the vehicle battery. The locking cylinder 20, of metal and hence connected to the bail or bolt 23, is electrically connected via line 38 with the LED 32 which, further, is connected over an additional line 39 with a second contact spring 40. The second contact spring 40 is so located at the bottom of the dummy cassette 17" that, when the dummy cassette 17" is inserted into the holder for the cassette, it forms an electrical ground or return or chassis connection to the accessory equipment, and hence a return current path through the vehicle battery. Of course, a flasher 41 can be provided and connected in the circuit, if desired.

Terminals 37, 40—FIGS. 6 and 7—can also be used in the embodiment of FIG. 5 to provide charge terminals for the battery 33 if the battery is of the rechargeable type. The battery will then recharge when the dummy cassette is located in position and locked to provide for continuous flashing even if the vehicle battery should be removed, e.g. stolen.

We claim:
1. In combination with a vehicle,
a locking arrangement for a tape deck accessory apparatus (10) installed in the vehicle, wherein said tape deck accesory includes
an accessory housing (16') formed with an opening (14) to receive a tape cassette; and wherein
the vehicle includes
a frame (11, 30), secured within the vehicle and located behind a dashboard of the vehicle, shaped to telescopically receive and at least in part surround the accessory housing,
said arrangement comprising, in accordance with the invention,
means for preventing unauthorized removal of the accessory apparatus from the vehicle including a dummy cassette (17) shaped to fit into the cassette opening and insertable in the tape cassette receiving opening of the housing (16'),
said dummy cassette having a lock (18) accessible from the front side of the dummy cassette, said lock including a locking bolt (23) movable between an open, or unlocked and a closed, or locked position upon operation of the lock with an appropriate key (26),
and wherein the dummy cassette (17), the accessory housing (16) and the frame (11, 30) of the vehicle are formed with at least approximately aligned openings (27, 27', 27"), positioned to receive the locking bolt (23) when the dummy cassette (17) is inserted into the tape cassette receiving opening and the lock is moved into locked position,
said bolt being of sufficient size to engage, when in locked position, in the window (27") of the frame (11) of the vehicle, to thereby lock the tape deck accessory apparatus (10) to the frame (11) of the vehicle.

2. Locking arrangement according to claim 1, wherein the opening is arranged to receive the cassette transversely,
and wherein the lock has a lock axis, and the locking bolt is pivotable about the lock axis and operable in a plane transversely to the plane of tape operation within the opening.

3. Locking arrangement according to claim 1, wherein the opening is adapted to receive cassettes for longitudinal insertion,
and wherein the lock has a lock axis, and the lock axis extends parallel to the plane of operation of tape in the tape deck.

4. Locking arrangement according to claim 1, wherein the dummy cassette includes at least two locks (18, 418a, 418b), each of said locks having a locking axis;
and wherein the locking axes of at least two of the locks extend transversely with respect to each other to permit selective insertion of the dummy cassette into cassette openings formed with windows (27") selectively located to receive at least one of the respective locking bolts when the dummy cassette is inserted into the cassette opening and the locking bolt is moved to locked position.

5. Locking arrangement according to claim 1, wherein the frame comprises a reception frame (11) shaped to telescopically receive the tape deck accessory;
and wherein the window (27") is formed in said frame.

6. Locking arrangement according to claim 1, wherein the frame includes a holding strap (30) for retaining the tape deck accessory in the vehicle;
and wherein the window (27") formed in the frame comprises an opening formed in the holding strap (30).

7. Locking arrangement according to claim 6, wherein the holding strap extends longitudinally of the tape deck accessory and is securely connected in the vehicle.

8. Locking arrangement according to claim 1, further comprising
an electrically operated light source (32) provided on the dummy cassette (17', 17"); and
electrical switch terminal means operable upon locking of the lock (18) for connection of the light source (32) to a source of electrical energizing voltage to thereby optically, visually indicate that the accessory apparatus is locked in position in the vehicle, and that a lock within the vehicle has been engaged.

9. Locking arrangement according to claim 8, further including a battery (33) located in the dummy cassette (17') and forming the source of electrical energizing voltage.

10. Locking arrangement according to claim 9, wherein the battery is a rechargeable battery; and
electrical connection terminals (37, 40) are provided on the dummy cassette connectable to a source of charge energy to provide for recharging of said battery.

11. Locking arrangement according to claim 8, wherein the electrical switch terminal means comprise a contact spring (36) secured to the dummy cassette (17') and engageable by the locking bolt (23) of the lock (18).

12. Locking arrangement according to claim 8, for use in an automotive vehicle having a vehicle battery and forming said source of electrical energizing voltage;
wherein the dummy cassette (17") includes a connecting terminal spring (37) secured thereto and forming one terminal for a circuit including said electrically operated light source (32), and a second terminal spring (40) forming a second terminal for said electrically operated light source;
and wherein the frame (11, 30) includes an insulated connecting spring engageable with the first terminal spring (37), said frame being connected to ground or chassis and forming an electrical return path to the vehicle battery and engageable by the second contact spring (40) when the dummy cassette is inserted in the frame.

13. Locking arrangement according to claim 12, wherein the dummy cassette is of insulating material;
the lock (18) is of metal, and retained in the dummy cassette.

14. Locking arrangement according to claim 8, wherein the electrically operated light source (32) comprises a light emitting diode (LED).

15. Locking arrangement according to claim 8, further including a pulse source or flasher connected in circuit with the electrically operated light source to provide a flashing output thereof when said light source is energized.

16. Locking arrangement according to claim 15, wherein the electrically operated light source (32) comprises a light emitting diode (LED).

17. Locking arrangement according to claim 10, wherein the electrically operated light source comprises a light emitting diode (LED) (32), and a pulse source or flasher (41) is provided, serially connected with the LED (32) to provide a flashing output thereof when the LED is energized.

18. Locking arrangement according to claim 11, wherein the electrically operated light source comprises a light emitting diode (LED) (32), and a pulse source or flasher (41) is provided, serially connected with the LED (32) to provide a flashing output thereof when the LED is energized.

19. Locking arrangement according to claim 12, wherein the electrically operated light source comprises a light emitting diode (LED) (32), and a pulse source or flasher (41) is provided, serially connected with the LED (32) to provide a flashing output thereof when the LED is energized.

* * * * *